UNITED STATES PATENT OFFICE.

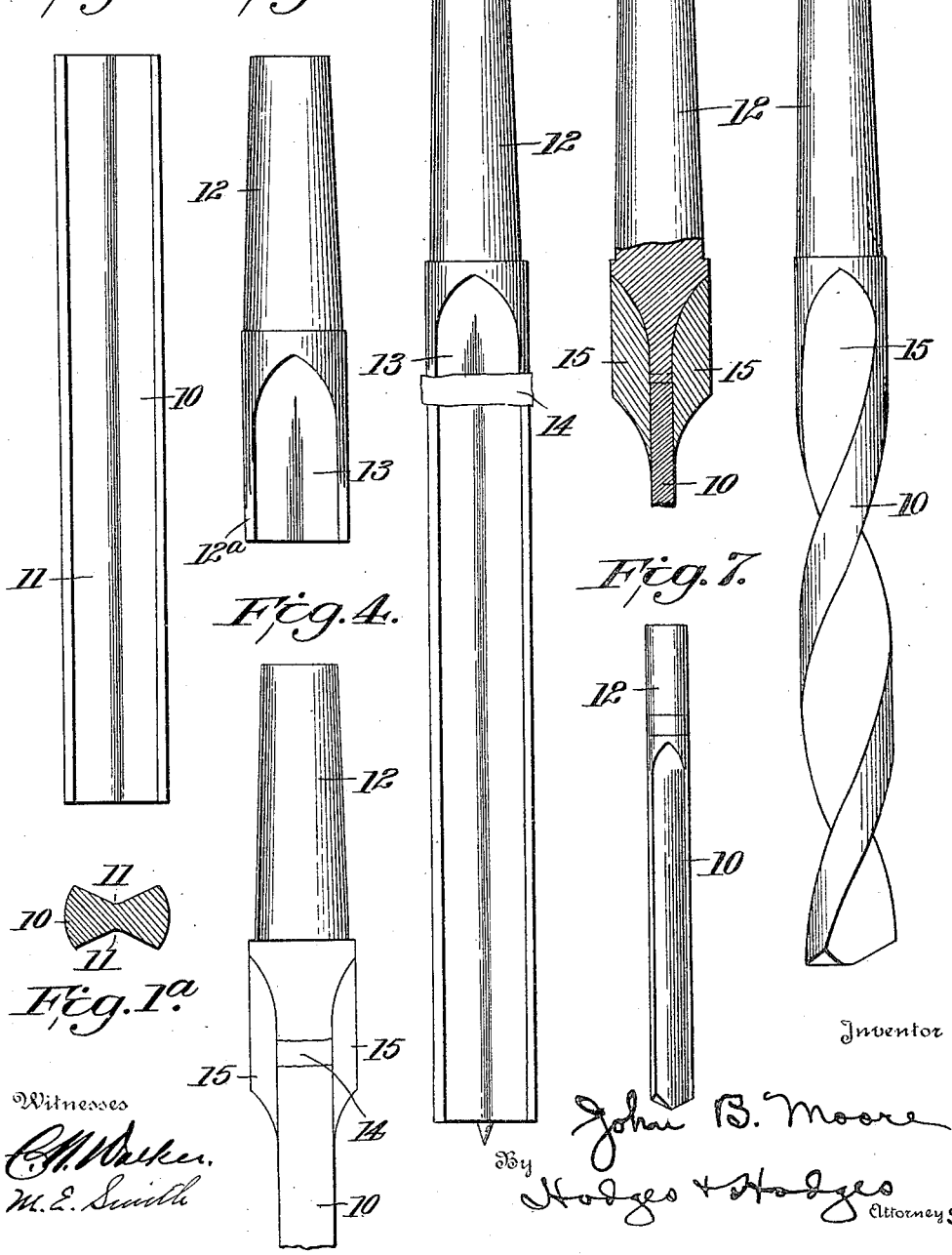

JOHN B. MOORE, OF LATROBE, PENNSYLVANIA, ASSIGNOR TO LATROBE TOOL COMPANY, OF LATROBE, PENNSYLVANIA, A CORPORATION OF PENNSYLVANIA.

TWIST-DRILL.

1,122,786.  Specification of Letters Patent.  Patented Dec. 29, 1914.

Application filed December 18, 1913. Serial No. 807,525.

*To all whom it may concern:*

Be it known that I, JOHN B. MOORE, a citizen of the United States, residing at Latrobe, in the county of Westmoreland and State of Pennsylvania, have invented new and useful Improvements in Twist-Drills, of which the following is a specification.

This invention relates to an improvement in twist drills.

Owing to the excessive cost of the high speed steels of which twist drills, and the like, are usually constructed, attempts have been made from time to time to construct such drills in two parts by forming the body or working portion of high grade material and securing the same to a shank of ordinary carbon steel. Such structures, however, are open to the objection that they are weakest at the point of union between the body and the shank, and are easily broken at that point under the strains encountered by the tool in operation.

One of the objects of the present invention is to produce a "two part" drill, *i. e.* a drill formed with a body of high speed steel and a shank of carbon steel, which will conform to the general outline of the old style of drills constructed by milling, and which will have its greatest strength at the point of union between the body and the shank.

The invention will be hereinafter fully set forth and particularly pointed out in the claims.

In the accompanying drawing:—Figure 1 is a side view illustrating the blank of high speed steel from which the body of the tool is constructed. Fig. 1ª is a sectional view. Fig. 2 is a similar view of a shank of lower grade material. Fig. 3 is a side view illustrating the first step of uniting the body and the shank. Fig. 4 is a view illustrating the body and shank united ready for finishing. Fig. 5 is a sectional view thereof and Fig. 6 is a view of the finished drill. Fig. 7 is a view of a finished drill with a straight flute.

Referring to the drawings, 10 designates a blank of any suitable high grade material of which the body of the drill is to be made, the same being provided with longitudinal grooves so as to be approximately X-shaped in cross section as indicated at 11. The shank member 12 of lower grade material is provided with a tang portion adapted to fit a drill socket, and it is also provided with a portion 12ª provided with recesses 13 so as to cause the same to conform to the cross section of the blank 10. In practice the blank 10 and the shank-member 12 are placed in a suitable electrical welding apparatus, and united by a butt weld as indicated in Fig. 3, the pressure of bringing the parts together causing the metal to squeeze out at the joint to form what is termed the "flash" as indicated at 14. This "flash" may be removed by any suitable means, if desired, although I do not find it necessary to the success of my invention, to so remove it. After the parts are welded together in the manner thus described, I splice the joint formed by the welding, by filling in the grooves 11 and recesses 13 with molten metal, preferably using the oxyacetylene blow pipe for the purpose of welding the splicing material directly to the body and shank so as to become practically integral therewith, as indicated at 15, Fig. 4. Any suitable material may be used as a filling to form a splice, and I do not desire to limit myself in this particular. Excellent results have been obtained by using steel, phosphor-bronze and the like. After the filling or splice has been applied to the parts the tool is ready for the final finishing steps, and after the body has been twisted and the drill finished the same presents the appearance illustrated in Fig. 6. Another form is illustrated in Fig. 7. In this connection it will be noted that the body of the drill is not twisted, until after the same has been united to the shank. It will also be noted that while I have described my improved process in connection with twist drills I do not desire to limit myself in this particular as it is equally applicable to drills that are not twisted. It will be further understood that while I have described the drill body as made of flat metal and twisted after its union to the shank member, I do not desire to limit myself thereto, as it is obvious that the drill body may be twisted before the welding operation takes place.

From what has been said it will be observed that I have produced a two-part drill comprising a body of high speed steel and a shank of carbon steel, which conforms in general outline to the old style drills made by milling. It will be further noted that the drill thus constructed has no enlargements at the point of union between the body and the shank, and by reason of the splicing of the joint in the manner described, the drill possesses greater strength at the joint than elsewhere so that it will not break at that point. Furthermore by uniting the body and the shank in the manner described, the body may be heated and twisted without in any manner impairing the joint with the shank.

Having thus explained the nature of my invention, and described an operative manner of constructing and using the same, although without attempting to set forth all of the forms in which it may be made, or all of the modes of its use, what I claim is:—

1. An improvement in twist drills and the like comprising a body of high speed metal and a shank of low grade metal having abutting ends welded together, and a metal splice extending across the point of union and inseparably connected with both the shank and the body.

2. An improvement in twist drills and the like comprising a body of high speed metal and a shank of low grade metal having abutting ends welded together and provided with depressions, the depressions in said shank extending parallel with the longitudinal axis of the tool and a metallic filling located in said depressions and extending across the point of weld.

3. An improvement in twist drills and the like comprising a body having a groove, a shank having a recess registering with said groove, said body and shank being united at their contiguous ends, and a metallic filling located in said groove and recess and extending longitudinally of the shank and body and across the point of union of said body and shank.

4. An improvement in twist drills and the like comprising a body of approximately X-shape in cross-section, a shank provided with a portion corresponding to said body in cross-section, said shank and body having abutting ends welded together, whereby longitudinal grooves are formed, and integral metallic splices extending across the point of union to said shank and body within said grooves.

In testimony whereof I have hereunto set my hand in presence of two subscribing witnesses.

JOHN B. MOORE.

Witnesses:
Jos. E. BARNETT,
F. B. McFEELY.

Copies of this patent may be obtained for five cents each, by addressing the "Commissioner of Patents, Washington, D. C."